United States Patent
Armstrong et al.

(10) Patent No.: US 6,313,961 B1
(45) Date of Patent: *Nov. 6, 2001

(54) METHOD AND APPARATUS FOR CALIBRATING A SYNCHRONOUS READ CHANNEL INTEGRATED CIRCUIT

(75) Inventors: Alan J. Armstrong, Broomfield, CO (US); Renee E. Wallerius, Freemont, CA (US); Richard T. Behrens, Louisville; Charles J. Duey, Westminster, both of CO (US)

(73) Assignee: Cirrus Logic, Inc., Austin, TX (US)

( * ) Notice: Subject to any disclaimer, the term of this patent is extended or adjusted under 35 U.S.C. 154(b) by 1452 days.

(21) Appl. No.: 08/583,295

(22) Filed: Jan. 5, 1996

Related U.S. Application Data

(63) Continuation of application No. 08/236,719, filed on Apr. 29, 1994, now abandoned.

(51) Int. Cl.[7] ........................................... G11B 5/09
(52) U.S. Cl. ................... 360/46; 360/51; 360/65; 360/67
(58) Field of Search .................. 360/46, 51, 65, 360/67, 53; 364/724.19, 724.2; 375/232, 236; 708/322, 323

(56) References Cited

U.S. PATENT DOCUMENTS

| | | |
|---|---|---|
| 5,121,260 | 6/1992 | Asakawa et al. . |
| 5,121,262 * | 6/1992 | Squires et al. ........................ 360/46 |
| 5,121,263 | 6/1992 | Kerwin et al. . |
| 5,132,988 | 7/1992 | Fisher et al. . |
| 5,150,387 | 9/1992 | Yoshikawa et al. . |
| 5,268,848 | 12/1993 | Coker et al. . |
| 5,341,249 * | 8/1994 | Abbott et al. ...................... 360/53 X |
| 5,381,359 | 1/1995 | Abbott et al. . |
| 5,392,295 | 2/1995 | Coker et al. . |
| 5,416,646 * | 5/1995 | Shirai ..................................... 360/46 |
| 5,424,881 | 6/1995 | Behrens et al. . |
| 5,426,541 | 6/1995 | Coker et al. . |
| 5,623,377 * | 4/1997 | Behrens et al. ......................... 360/65 |

OTHER PUBLICATIONS

Abbott et al., "Channel Equalization Methods for Magnetic Storage," *IEEE* 53.3, pp. 1618–1622, 1989.

Coker et al., "Implementation of PRML in a Rigid Disk Drive," *IEEE Transactions on Magnetics*, vol. 27, No. 6, Nov. 1991.

Cideciyan et al., "A PRML System for Digital Magnetic Recording," *IEEE Journal on Selected Areas in Communications*, vol. 10, No. 11, pp. 50–55, Jan. 1992.

* cited by examiner

*Primary Examiner*—Alan T. Faber
(74) *Attorney, Agent, or Firm*—Howard H. Sheerin; Dan A. Shifrin

(57) ABSTRACT

A method and apparatus for calibrating the components of a Partial Response Read Channel (PRML) integrated circuit utilized in a magnetic storage device including a channel quality circuit, incorporated within the read channel IC, for automatically measuring the performance of each component as data is read by the channel. An error measurement for each component is generated as an indicator of the component's performance, such as a sample error generated by measuring the difference between the samples read by the channel and expected samples. The read channel components are programmed over a range of settings to determine the settings that generate the minimum error. By programming the components with settings corresponding to minimum error rates, the read channel is optimized. A programming device incorporated within the magnetic storage device and connected to the read channel IC executes a calibration program when the storage device is manufactured, repaired, and periodically to compensate for changes in the storage device and storage medium that occur over time.

16 Claims, 17 Drawing Sheets

SD2 REGISTER SETTING

METHOD AND APPARATUS FOR CALIBRATING A SYNCHRONOUS READ CHANNEL INTEGRATED CIRCUIT

CONTINUATION STATUS

This application is a continuation of U.S. patent application Ser. No. 08/236,719 filed on Apr. 29, 1994 now abandoned.

FIELD OF INVENTION

This invention relates to computer technology and more specifically to systems for storing and retrieving digitized data on magnetic storage media.

CROSS REFERENCE TO RELATED APPLICATIONS AND PATENTS

This application is related to other co-pending U.S. patent applications, namely application serial numbers 08/222,666 and 08/545,965, which relate to "Spectral Smoothing Filter" and "Channel Quality." This application is also related to several U.S. patents, namely U.S. Pat. No. 5,291,499, 5,297,184, 5,329,554, 5,359,631, and 5,424,881 which relate to "Method and Apparatus for Reduced-Complexity Viterbi-Type Sequence Detectors," "Gain Control Circuit for Synchronous Waveform Sampling," "Digital Pulse Detector," "Timing Recovery Circuit for Synchronous Waveform Sampling," and "Synchronous Read Channel." All of the above-named patent applications and patents are assigned to the same entity, and all are incorporated herein by reference.

BACKGROUND OF THE INVENTION

A read channel is the circuitry used in storage systems for reading data from a storage medium such as a rotating magnetic disk. A magnetic read head transduces magnetic transitions recorded on the storage medium into pulses in an analog read signal, and these pulses are detected and decoded by the read channel circuitry into a digital sequence. Decoding the pulses into a digital sequence can be performed by a simple pulse detector read channel or, as in more recent designs, using a partial response maximum likelihood (PRML) read channel. See, for example, Roy D. Cideciyan, Francois Dolivo, Walter Hirt, and Wolfgang Schott, "A PRML System for Digital Magnetic Recording", IEEE Journal on Selected Areas in Communications, Vol. 10 No. 1, Jan. 1992, pp.38–56.

The more complex PRML read channels are comprised of many different components such as an analog pulse equalizing filter, an analog to digital converter, a digital equalizing filter, a pole tip filter, a timing recovery circuit, an automatic gain control circuit, and a maximum likelihood (ML) sequence detector. These components can be integrated into a single read channel integrated circuit (IC) having mixed analog/digital circuitry. PRML read channels are preferred over the simpler pulse detection schemes because they decrease the necessary bandwidth allowing more data to be stored on the storage medium. However due to their complexity, the performance and accuracy of a PRML channel depends on the performance and accuracy of each component therein.

In order to operate optimally, the components of the read channel must be tuned to the particular operating characteristics of the storage system. For instance, the read channel can be tuned to operate according to the characteristics of a particular magnetic read head, a particular height the head operates above the storage medium, or a particular speed at which the magnetic storage medium is moving, as in a magnetic disk spinning. Also, the characteristics of the storage medium vary between each disk drive because there are slight but significant differences in composition and in manufacturing. These characteristics of the storage medium may degrade over time as well. Therefore, the read channel should be tuned to operate according to the characteristics of a particular drive as well as the characteristics of the magnetic storage medium. A further consideration is that in magnetic disk storage systems, the characteristics of the magnetic disk change as the track radii change. For these systems, the disk is partitioned into several zones having a varying data density per track and the read channel is tuned to operate in each zone.

The prior art techniques for calibrating the read channel can be separated into two general groups, adaptive and non-adaptive systems. Adaptive calibration systems, such as those disclosed in U.S. Pat. No. 5,132,988 and in U.S. Pat. No. 5,150,379, utilize characteristics of the data as it is being read to "adapt" the parameters of the read channel. Thus the components of the read channel are continuously calibrated to operate at an optimum level. The problem with adaptive techniques is that they involve more complex and expensive signal processing circuitry, and they can exhibit systematic errors in converging to a proper value due to instabilities and noise in the system.

There are non-adaptive calibration techniques that are not as complex as adaptive systems and are not prone to non-convergence problems. For instance, in U.S. Pat. No. 5,121,260 a read channel optimization system is disclosed where the characteristics of the storage system and storage medium are measured when the storage system is manufactured. The optimization comprises writing and reading test data to and from the storage medium and measuring the system characteristics as the data is processed by the read channel. Well known instrumentation for measuring the characteristics are used, such as oscilloscopes and spectrum analyzers, and the measurement data for each zone is stored at a specific location on the storage medium. During operation, the characteristic data is read from the storage medium and used to calibrate the read channel.

The problem with this technique is that the instrumentation used to measure the characteristic data is sophisticated and expensive. Further, it is difficult to automate the system of measuring and storing the data and the number of measurement instruments is limited. Yet another problem with this technique is that it does not compensate for changes over time because the calibration is performed only during manufacturing. Finally, if the storage system is repaired by replacing a component or changing the storage medium, the system must be re-calibrated using the sophisticated measuring equipment.

Another deficiency with prior art methods for calibrating a read channel is the inability to tune the components in a particular sequence to achieve optimum performance. For instance, the parameters of one component may affect the operation of another component, e.g. the parameters of the analog equalizing filter affect the automatic gain control circuit and timing recovery circuit. Thus the performance of these circuits is affected by the sequence in which they are calibrated.

Yet another deficiency with prior art calibration techniques is the inability to compensate for asymmetrical pulses in a PRML read channel. Asymmetrical pulses cause errors in the gain control and timing recovery circuits due to incorrect "a", "b", "1", and "c" target detector levels.

A further desired feature not provided by prior art optimization techniques is the ability to verify the performance of a read channel by testing the bit error rate after a calibration and to re-calibrate the read channel successively until an optimum bit error rate is achieved.

Thus, it is a general object of the invention to provide an easy and inexpensive method to automatically calibrate the components of a read channel IC to operate according to the characteristics of a particular storage system that does not exhibit the non-convergence problems associated with adaptive techniques, nor requires sophisticated measuring equipment. Another object is to provide an automated calibration method that can be performed throughout the life of the storage system to compensate for changes occurring over time. Yet another object is to calibrate the components of the read channel in a specific sequence or in combination to achieve optimum performance. Still another object is to generate a bit error rate of the system after calibration and to re-calibrate the components until a desired minimum bit error rate is achieved.

SUMMARY OF THE INVENTION

The objects of the present invention are achieved by incorporating, within a read channel IC, a means for automatically measuring the performance of each component of the read channel as data is read by the channel. An error measurement for each component is generated as an indicator of the component's performance. For instance, a sample error is generated by measuring the difference between the samples read by the channel and the expected samples. A read channel component, such as an analog equalizer, is programmed over a range of settings to determine the setting that generates the minimum sample error. By programming the components with settings corresponding to minimum error rates, the read channel is optimized. A circuit for measuring the sample, gain, timing, and bit errors in a read channel IC is disclosed in the above referenced co-pending U.S. patent application Ser. No. 08/087,617 entitled "Channel Quality."

The data processed by the read channel IC during calibration is generated by writing a known test pattern to the storage medium and then reading the data using the magnetic read head. Alternatively, the read data can be injected directly into the read channel IC from a signal generating device. In either method, the test data sequence is known so that an expected sample or bit sequence can be compared to that measured. Thus, in the read channel IC there is a means for generating and comparing expected sample values to the actual sample values in order to generate sample error values, and a means for comparing the bit sequence of the test pattern to the detected bit sequence in order to generate bit error values.

To calibrate a specific component of the read channel, the parameters of the component are programmed with a range of values and an error measurement generated for each parameter value. After sweeping the range of parameter settings, the component is programmed with the setting corresponding to the minimum error measured. For instance, to calibrate the automatic gain control circuit a center and coarse gain setting are programmed over a specified range of values and a sample error is generated for each setting. The center and coarse gain settings corresponding to the minimum sample error are selected for programming the automatic gain control circuit.

To compensate for interdependent component parameters, the dependent components are programmed in a predetermined iterative sequence, or alternatively in combination, to minimize the error measurement. When calibrating components together, a matrix of component settings is programmed using all possible combinations and the settings that produce the minimum error are used. Although the overall performance of the channel is improved by calibrating the components together, it takes significantly more time because the number of parameters and possible combination thereof increases.

A bit error measurement, which is the difference between the expected digital sequence and the sequence generated by the read channel, is also generated to verify the effectiveness of the calibration. The read channel can be re-calibrated successively until a desired optimum bit error measurement is achieved.

To compensate for different characteristics of different read heads and changing characteristics in the radii of a magnetic disk, the components are calibrated for each head and for each zone in the storage system and these optimum settings are stored in memory. To achieve even better performance, the read channel can be calibrated according to different locations within each zone. Before reading data using a particular read head and from a specified zone, the calibration parameters are read from memory and programmed into the read channel components.

The entire calibration process is automatically performed by a programming device, such as a microprocessor or field programmable gate array, incorporated into the storage system. Therefore, sophisticated and expensive test equipment, such as oscilloscopes or spectrum analyzers, are not needed to perform the calibration. Further, the read channel can be re-calibrated automatically at any time to compensate for changes that occur over time. The circuitry used to generate the error measurements is less complex and less expensive than the circuitry used in prior art adaptive techniques, and the non-convergence problem is avoided.

DETAILED DESCRIPTION OF THE DRAWINGS

Figure 1:
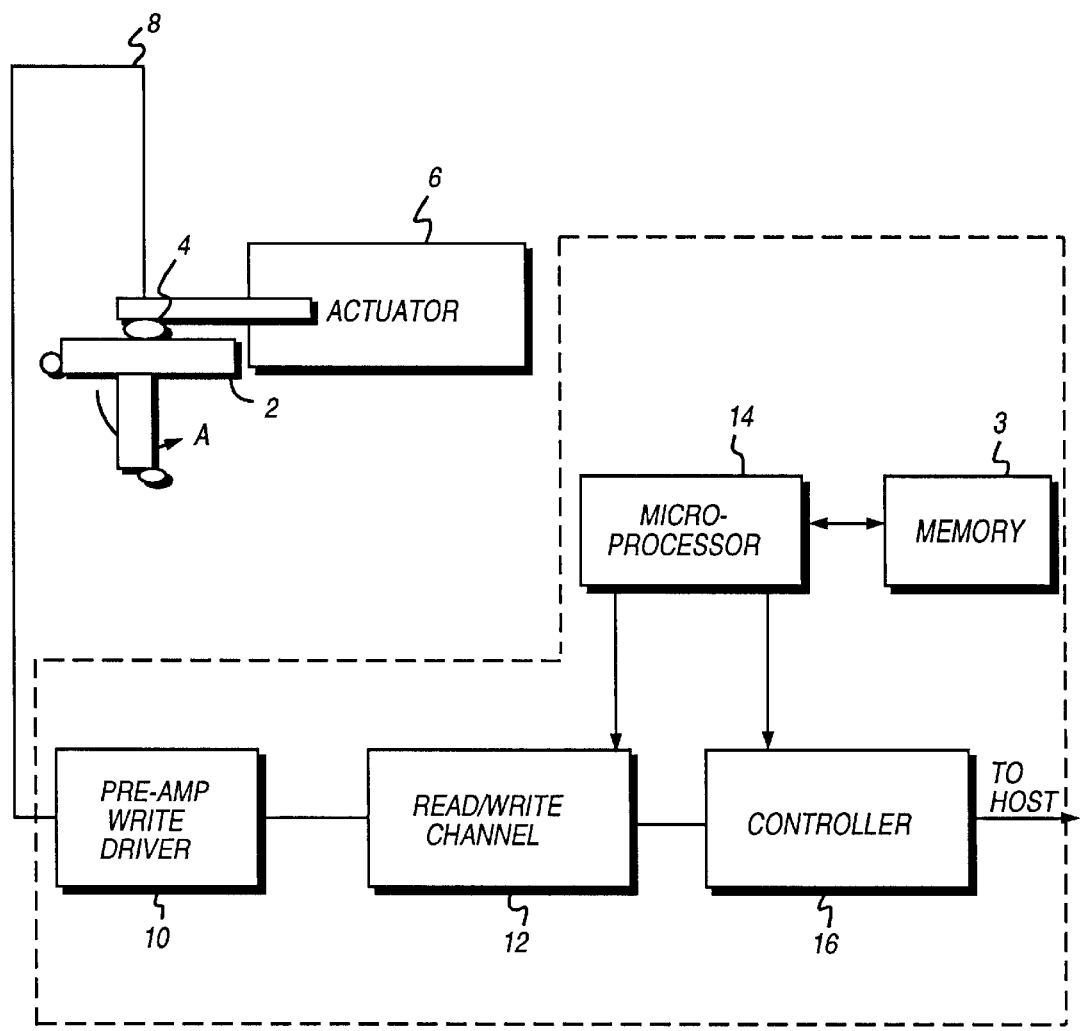
FIG. 1 shows an overview of the storage system.

Referring now in detail to the drawings wherein like characters refer to like elements throughout the various figures, FIG. 1 is an overview of the storage system having a magnetic read head 4 actuated 6 over a magnetic storage medium 2 for transducing the magnetic transitions into pulses in an analog read signal and transmitting the analog read signal over line 8 to a pre-amplifier 10. The pre-amplifier 10 amplifies the analog read signal for processing by the read channel 12. A microprocessor 14 calibrates the read channel and synchronizes data transfer between the read channel 12 and disk controller 16 during normal operation. The disk controller 16 provides the control and interface between the storage system and the host computer. Memory 3 stores the calibration program of the present invention as well as the resulting calibration data.

Figure 2:
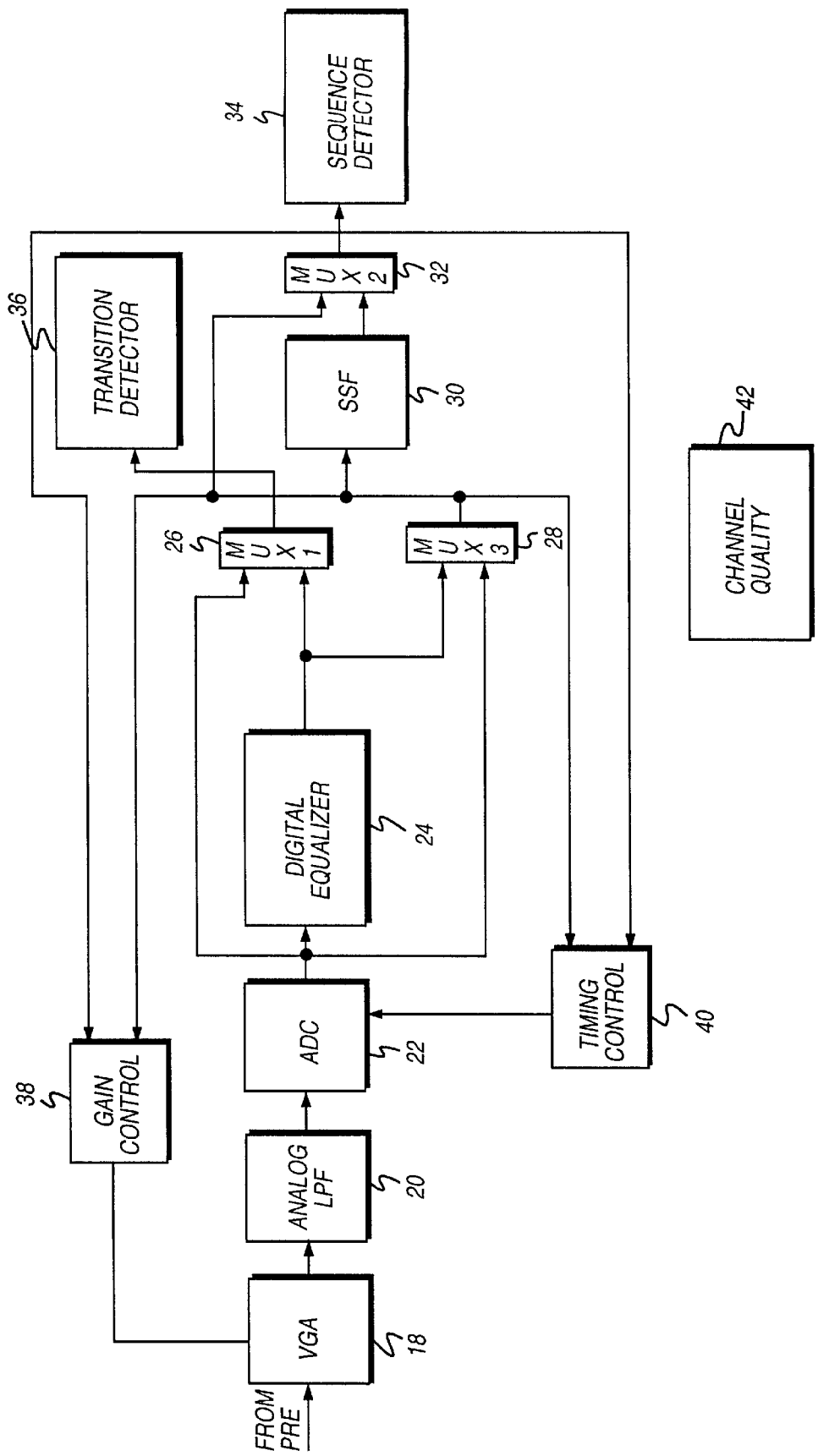
FIG. 2 shows a block diagram of the read channel IC components.

A block diagram of the components in the read channel is shown in FIG. 2 including a variable gain amplifier 18, an analog equalization filter 20, an analog to digital converter 22, a digital equalization filter 24, multiplexors 26 and 28 for bypassing the digital equalizer, a spectral smoothing filter 30, a multiplexor 32 for bypassing the spectral smoothing filter, a maximum likelihood (ML) sequence detector 34, a transition detector 36, an automatic gain control circuit 38, a timing recovery circuit 40, and a channel quality circuit 42.

The automatic gain control circuit adjusts the variable gain amplifier 18 to scale the analog input signals to the range of the analog to digital converter. An example automatic gain control circuit is disclosed in the above referenced U.S. Pat. No. 5,297,184 entitled "Gain Control Circuit for Synchronous Waveform Sampling."

The analog equalization filter 20 performs pulse shaping and attenuates frequencies above the Nyquist frequency (½ the sampling frequency) to avoid aliasing. Further pulse shaping is performed by the digital equalization filter, and the undesired secondary pulses generated by the magnetic read head are attenuated by the spectral smoothing filter. An example spectral smoothing filter is disclosed in the above referenced U.S. patent application Ser. No. 08/222,666 entitled "Spectral Smoothing filter."

The timing recovery circuit synchronizes the sampling of the analog input signal by the A/D converter 22. An example timing recovery circuit is disclosed in the above referenced U.S. Pat. No. 5,359,631 entitled "Timing Recovery Circuit for Synchronous Waveform Sampling". Decoding the sampled data into a digital sequence is performed by the Maximum Likelihood (ML) sequence detector 34. An example ML sequence detector is disclosed in the above referenced U.S. Pat. No. 5,291,499 entitled "Method and Apparatus for Reduced-Complexity Viterbi-Type Sequence Detectors."

Figure 3:
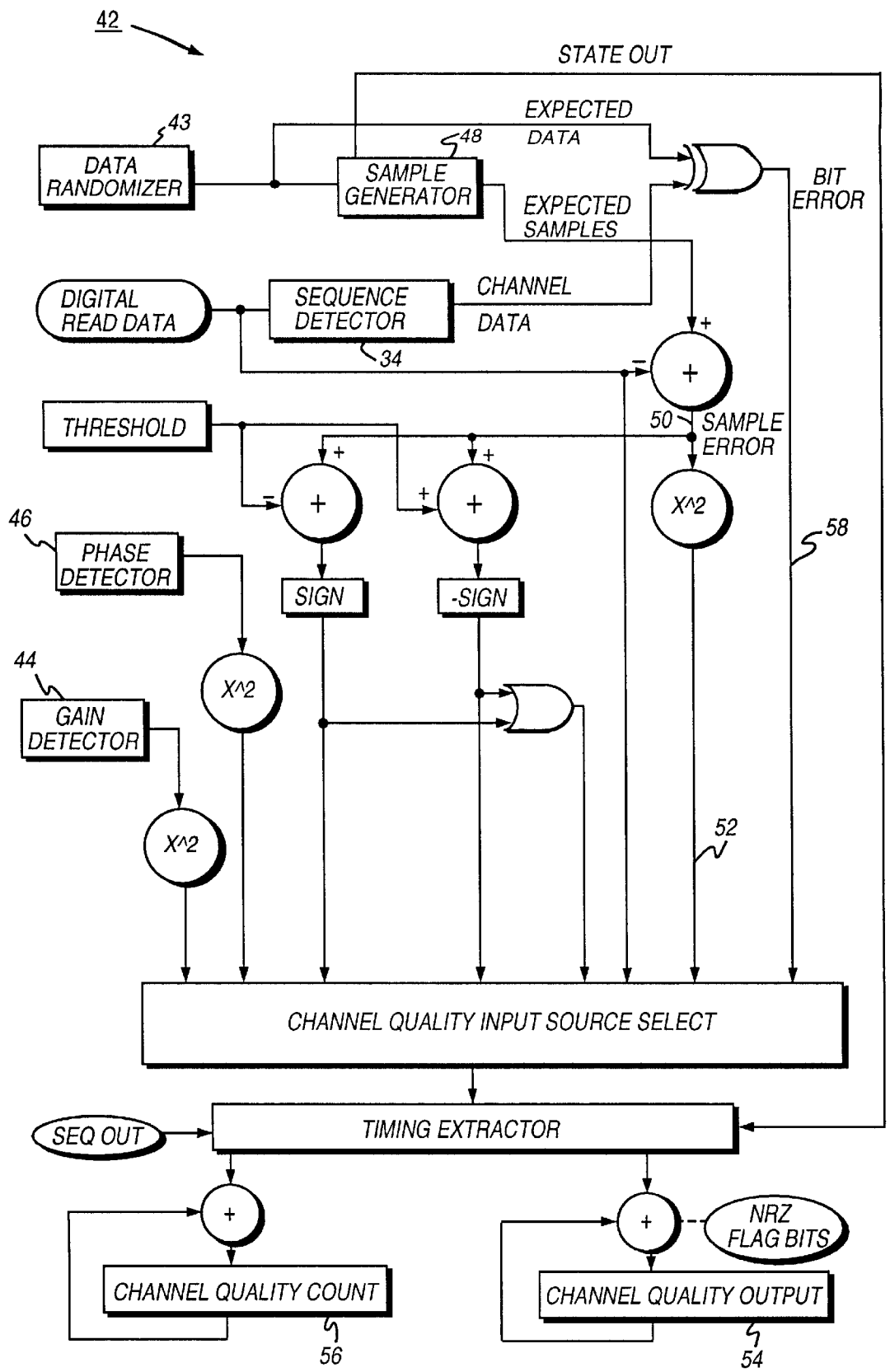
FIG. 3 shows a block diagram of the channel quality circuit for measuring various error values.

The channel quality circuit 42 as shown in FIG. 3 accumulates the error values used during calibration. Data randomizer 43 generates the test sequence of digital data written to the storage medium, and then read back by the read head and processed by the read channel during calibration. Gain error values 44 from the automatic gain control circuit and timing error values 46 from the timing recovery circuit are squared and accumulated in register 54. Sample generator 48 generates the expected samples using the test data from the data randomizer 43, and the actual samples are subtracted from the expected samples to generate a sample error value 50. The squared sample errors 52 are also computed and accumulated in register 54. A bit error rate 58, generated by comparing the expected sequence to the detected sequence, is also accumulated in register 54. The number of comparisons is stored in register 56 for computing an average error value. A detailed description of the channel quality circuit is provided in the above referenced co-pending U.S. patent application Ser. No. 08/545,965 entitled "Channel Quality".

Figure 4:
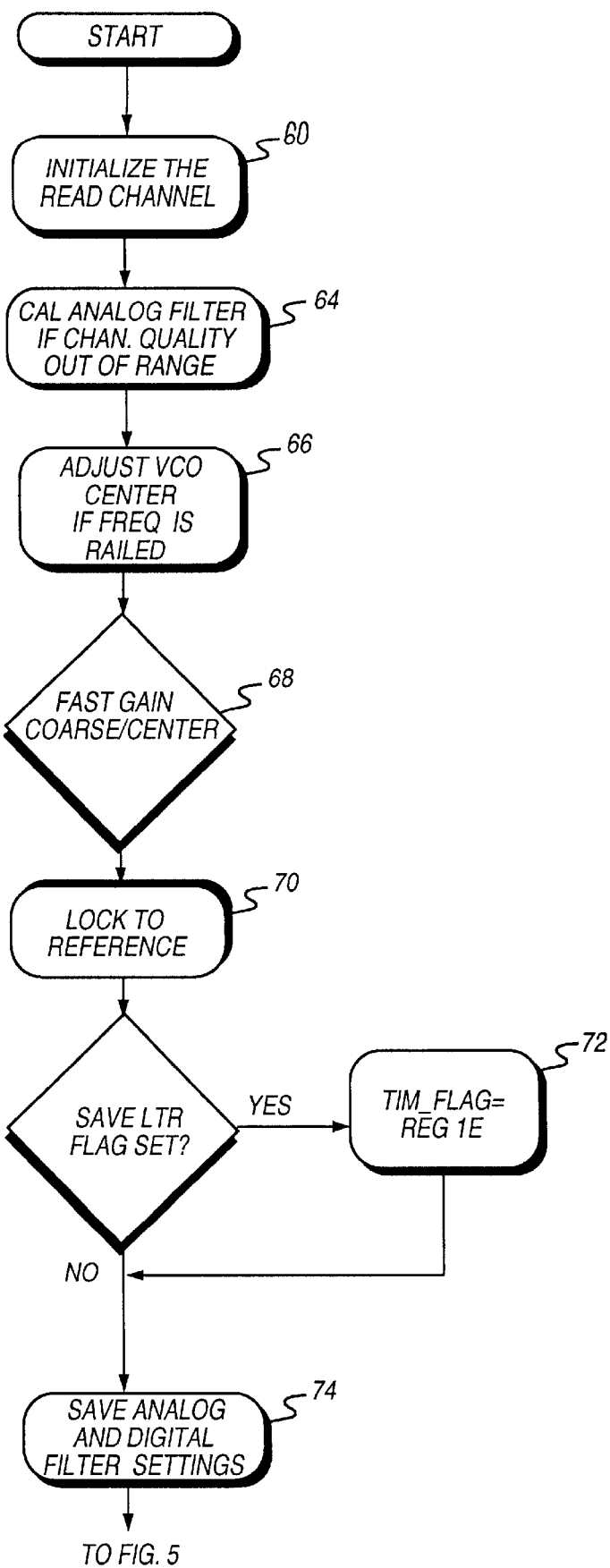
FIG. 4 to FIG. 8 show the flow charts of the sequence of calibration steps used in the present invention.
Figure 5:
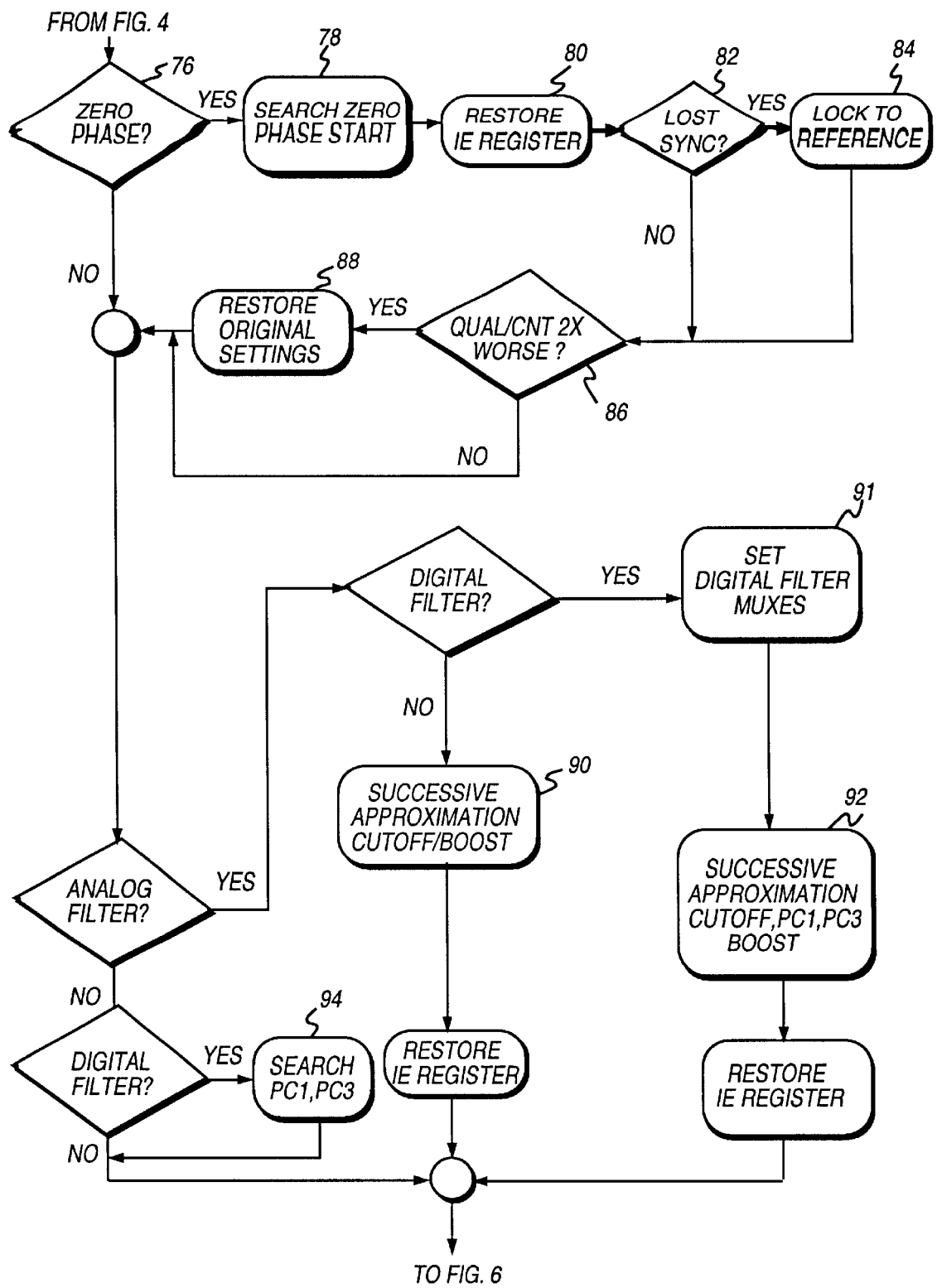

FIG. 4 through FIG. 5 illustrate the flow charts of the calibration program of the present invention for calibrating the read channel components. In the preferred embodiment, the microprocessor 14 executes the calibration program after the storage system is manufactured, after the storage system is repaired, and periodically during the life of the storage system to compensate for changes that occur over time. Implementing the calibration program using well known programming techniques is within the scope of those skilled in the art.

The components of the read channel are all calibrated by programming the operating parameters over a range of values and selecting the parameters that result in the smallest channel quality errors. There are different methods for searching the component parameters including searching every possible setting, searching from a minimum to a maximum setting in a specified step increment, and searching by a successive approximation over a matrix of parameter settings. In the successive approximation search, more than one parameter of a single or multiple components are searched at one time. Calibrating multiple components together improves the performance of the read channel if there are interdependencies between the components, however it takes longer to perform a successive approximation search as the number of possible settings increases.

The successive approximation algorithm is understood with reference to how the boost and cutoff settings of the analog filter are calibrated in combination. A matrix of, for instance, three values for each setting is used during the search:

cutoff: 2 4 6 boost: 3 5 7

All possible combinations of the three values for each setting are searched for the setting that results in a minimum channel quality error. After determining the minimum error settings, the matrix is modified by centering the values around the minimum error setting. If, for instance, the settings that resulted in the minimum error were cutoff=6 and boost=7, the values in the matrix are centered around 6 and 7 respectively:

cutoff: 4 6 8 boost: 5 7 9.

Figure 13:
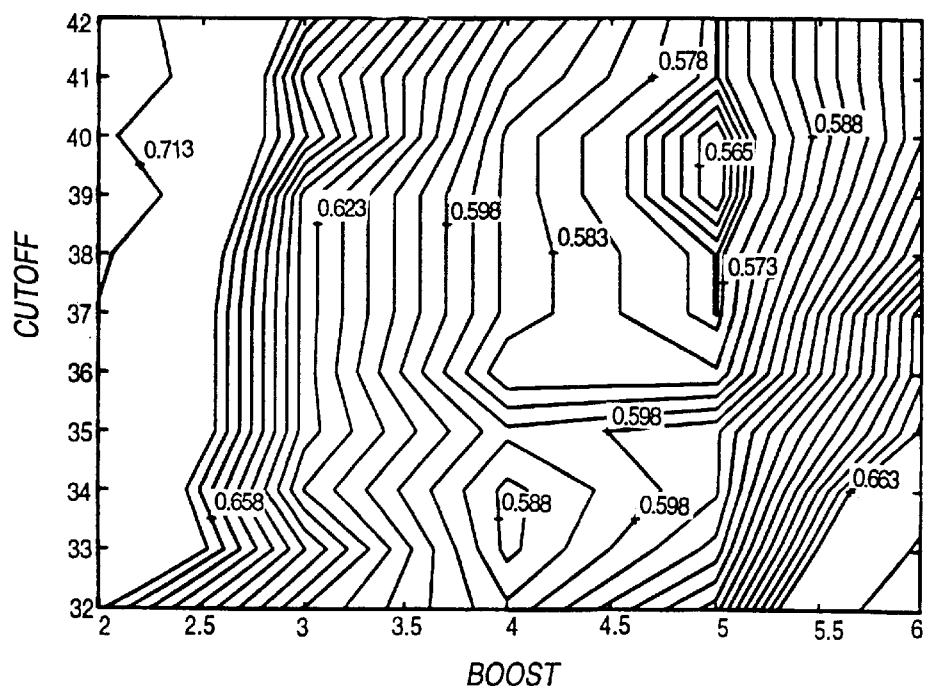
FIG. 13 is a contour plot of the cutoff and boost settings of the analog equalization filter versus squared sample errors.

Another search using all possible combinations is performed and the matrix values are again centered around the minimum error setting. This sequence repeats until the setting corresponding to the minimum error is the same as a prior search indicating that the optimum setting has been reached. The entire successive approximation search may then be repeated with a finer resolution to further optimize the component settings. Graphically, the successive approximation is a search for a valley on a contour plot of errors generated over a multidimensional range of settings (two dimensional for the cutoff and boost as shown in FIG. 13).

Once the optimum settings are found, an exhaustive search over a range of settings around the optimum setting is performed to further determine the best setting. For instance, if the optimum settings were 6 and 7 for the cutoff and boost respectively, there is a final search over all possible combinations for the following matrix:

cutoff: 4 5 6 7 8
boost: 5 6 7 8 9.

In addition to searching multiple settings for one component, the successive approximation search can calibrate multiple components in combination. Calibrating components in combination is necessary in some instances because their settings are interdependent. That is, changing the settings of one component may affect the performance of another component, therefore these components should be calibrated together or in an iterative sequence to achieve the optimum settings.

Another feature of the calibration method of the present invention is to selectively program only certain components. Thus the calibration sequence can be modified such that only certain components are tuned and in a varying order to further optimize the channel. These calibration and searching techniques for each component of the read channel are hereinafter described.

Starting with FIG. 4, the first step is to initialize 60 the read channel components with estimated nominal settings so that the channel will operate even though not at an optimum level. Next, the channel is directed to take several test readings and the channel quality count for the squared sample errors is returned. If the squared sample errors is excessively large, an attempt is made to bring the read channel into an acceptable operating mode by calibrating the analog filter. Calibrating the analog filter is described below.

Figure 11:
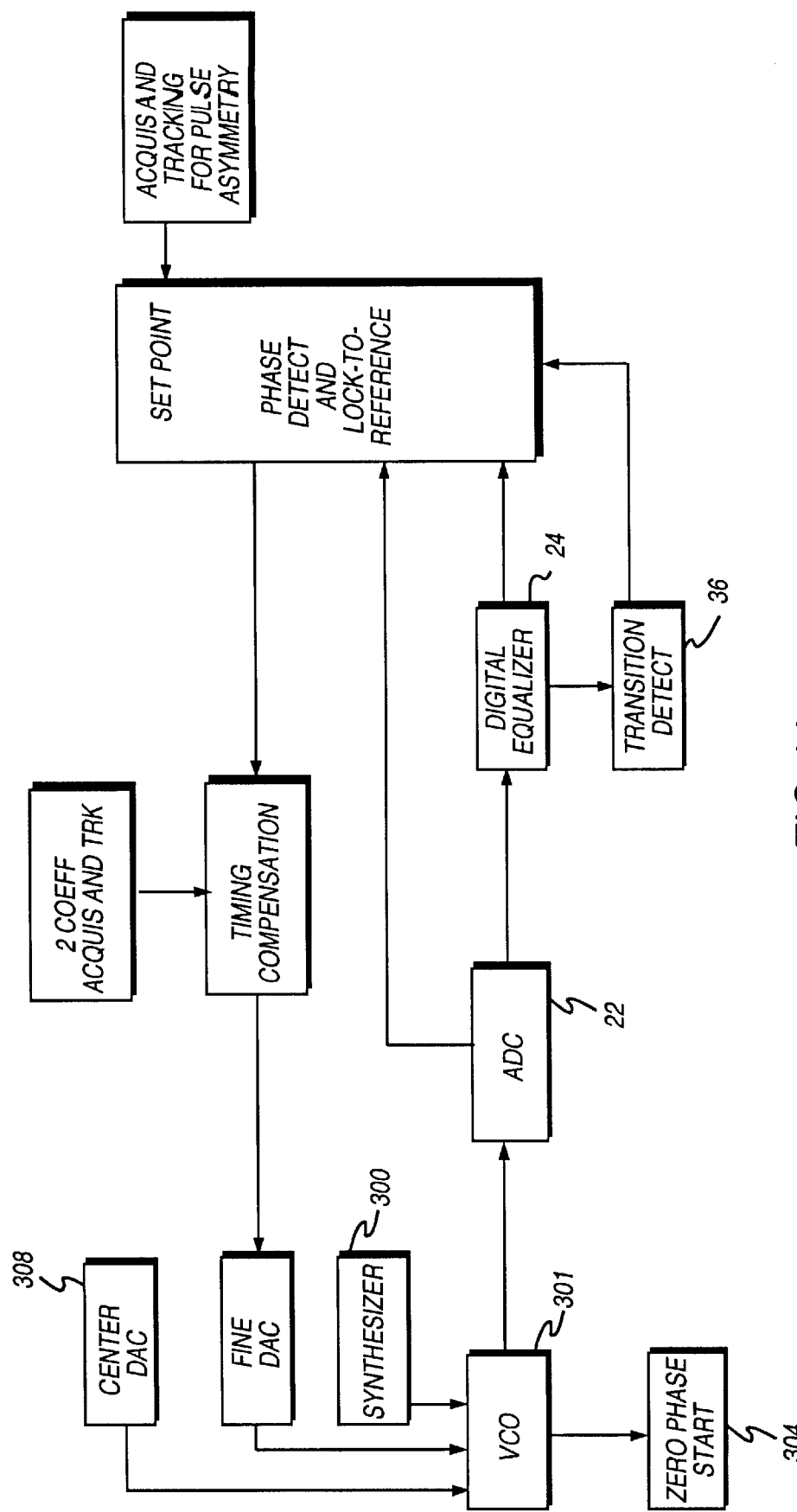
FIG. 11 a block diagram of the timing recovery circuit.

The read channel is then directed to take several more readings and the timing errors are checked to verify that the timing recovery circuit is operating. If the timing errors are out of range, the VCO 301 center frequency 308 of the timing recovery circuit shown in FIG. 11 is calibrated 66 by searching for the VCO 301 center frequency setting that generates the minimum timing error.

Figure 9:
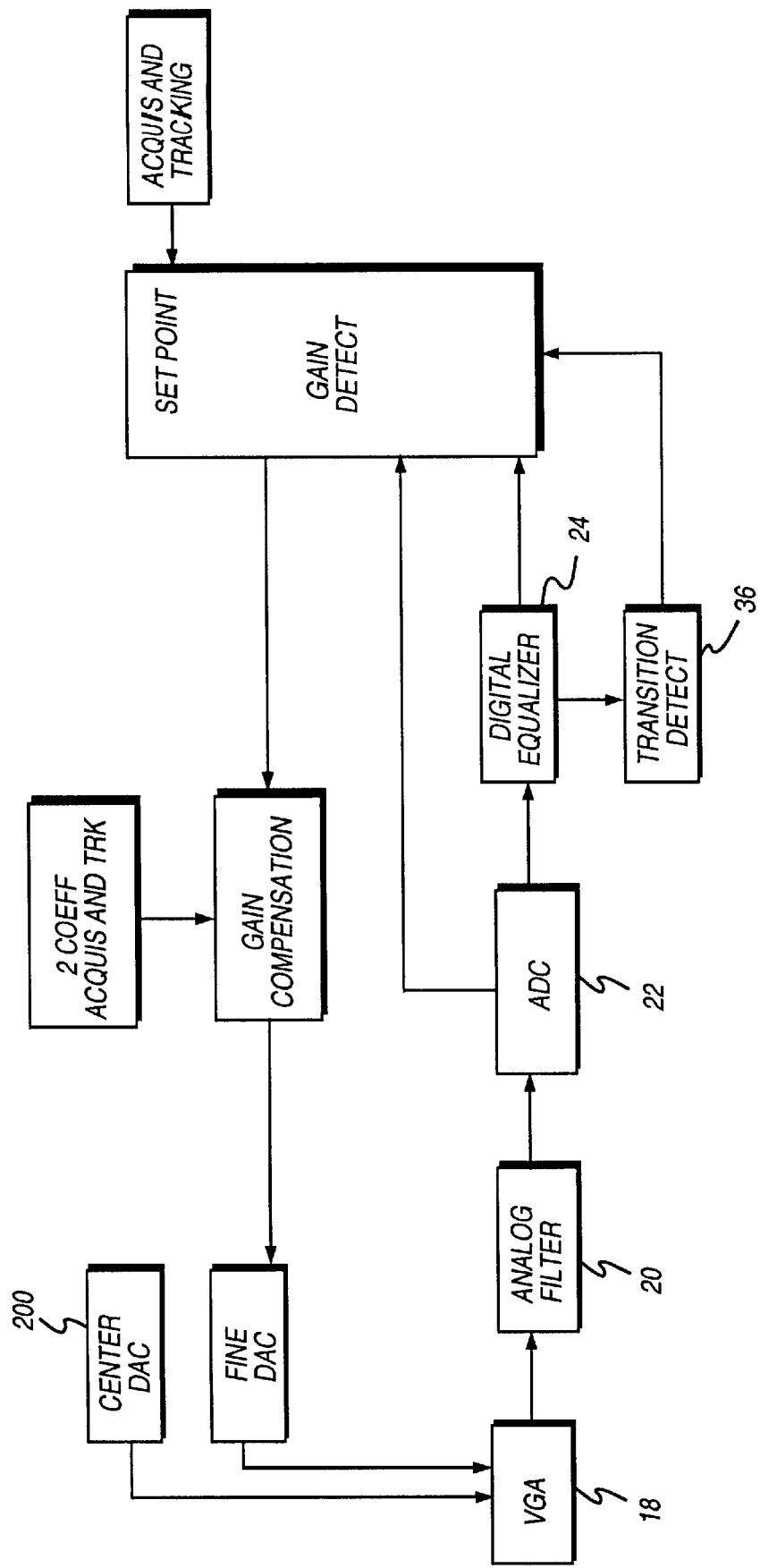
FIG. 9 shows a block diagram of the gain control circuit.
Figure 10:
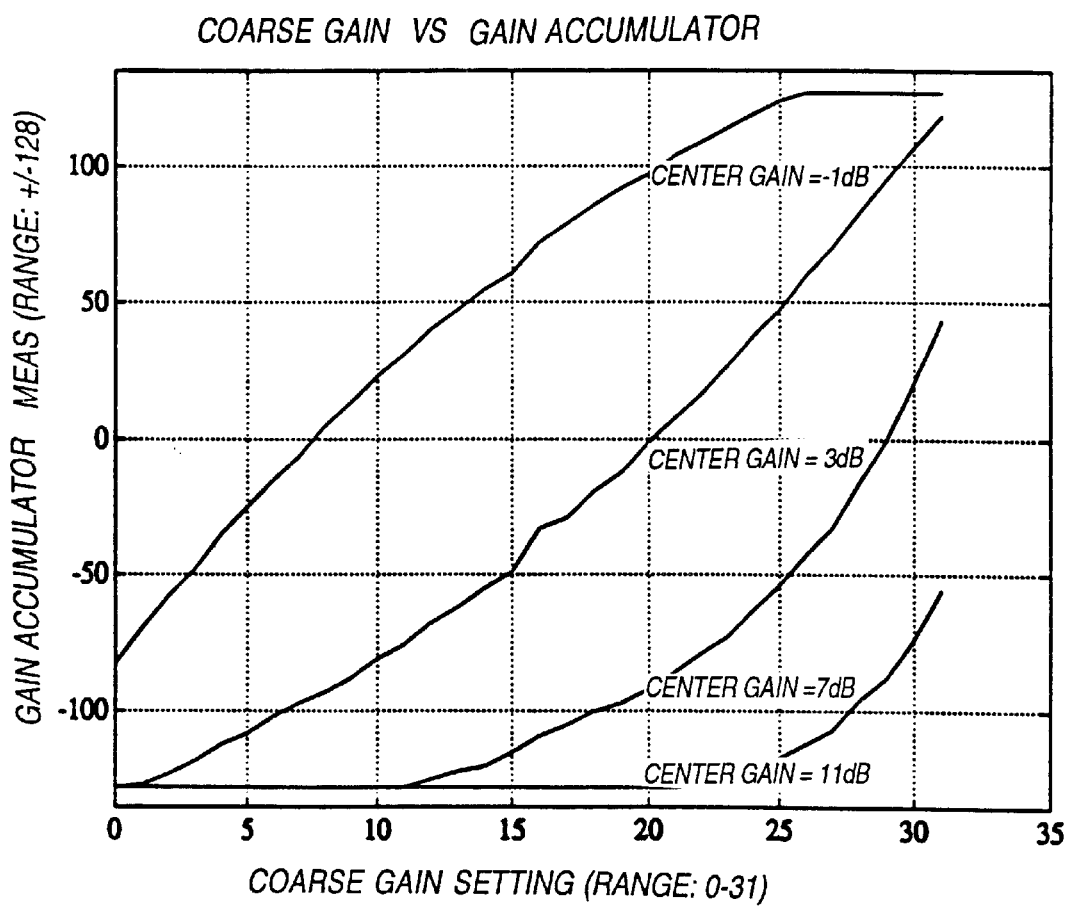
FIG. 10 is a graph of the coarse gain settings and center gain settings versus squared gain errors for the automatic gain control circuit.

Next, the automatic gain control circuit 38 shown in FIG. 9 is coarsely calibrated 68 to determine the optimum center operating gain before the equalization filters have been calibrated. The center operating gain corresponds to zero gain error, and there are two settings: center and coarse. First, the coarse setting is set to a mid-range value and an optimum center setting is searched over a range of values. After determining the optimum center setting, a range of coarse settings is searched and the setting that generates the minimum gain error is used. FIG. 10 shows an example graph of the squared gain errors for various center and coarse settings, where the optimum values for the center and coarse settings are 3 dB and 20 respectively.

After calibrating the gain control circuit, the phase locked loop of the timing recovery circuit is locked 70 to a reference frequency 300. The timing recovery loop synchronizes the sampling of the analog pulse signals so that the sampling occurs at the correct times. The reference frequency is an estimated nominal operating frequency for the timing recovery circuit. Once the lock to reference is complete, the timing error (register 1E) is optionally stored 72 and used to reset the timing recovery circuit after searching each setting. The timing error is also reset with the lock to reference value after calibrating each component which in effect re-locks the timing circuit to the reference frequency.

Before continuing with the calibration, the original settings for the analog and digital filters are saved 74 in case the performance is actually worse after the calibration in which case the original settings are restored.

Continuing to FIG. 5, the next component calibrated is the zero phase start 304 setting of the timing recovery circuit 40. After the timing recovery circuit is locked to the reference frequency, there will be a phase difference between the actual and desired sampling phase. To compensate for this phase error, the VCO 310 is paused for a period corresponding to the phase error. Consequently, the timing recovery circuit will start with a zero phase error.

Figure 12:
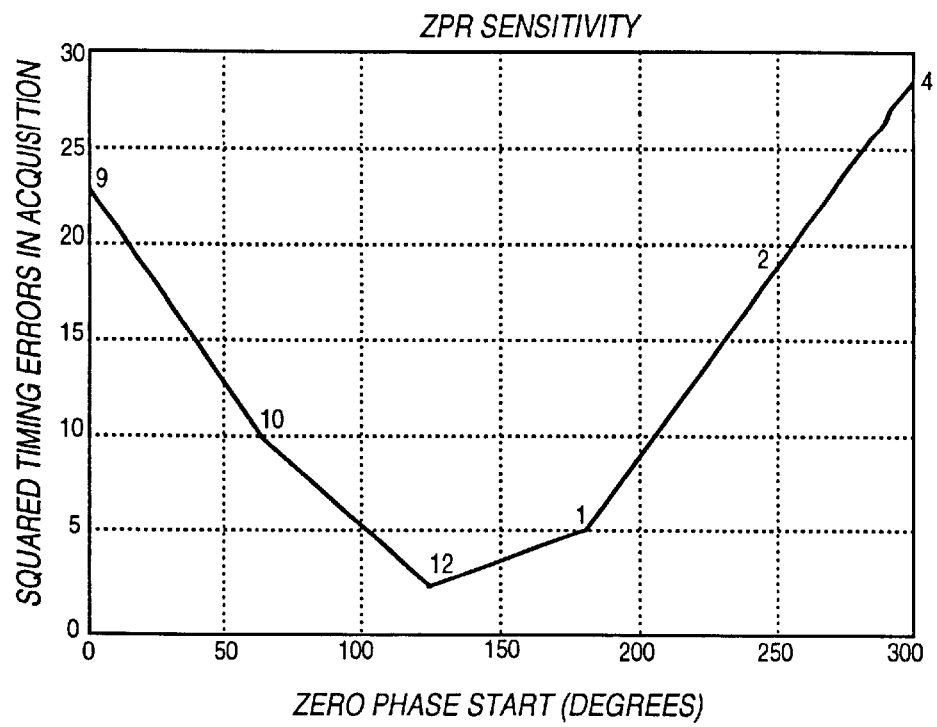
FIG. 12 is a plot of the zero phase restart setting of the timing control loop versus squared timing errors.

Before calibrating the zero phase start, the original setting is saved and restored if the calibration fails. A range of zero phase start values is searched for the setting that produces the minimum timing error. After calibrating the zero phase start, the timing error is reset 80 with the lock to reference value. The channel is directed to take another set of readings and the timing error is checked to determine if the timing recovery circuit has lost synchronization 82. If sync has been lost, a lock to reference 84 is performed to reset the circuit. If sync has not been lost but the timing error is still out of range 86, the original zero phase start setting is restored 88. FIG. 12 shows an example plot of the zero phase start setting versus squared timing errors with 130 degrees being the optimum setting.

Next, the analog 20 and digital 24 equalization filters are calibrated. If the digital filter is not being calibrated 90, then only the cutoff and boost settings for the analog filter are searched using the successive approximation algorithm. A successive approximation search is performed using a coarse resolution for the cutoff and boost settings followed by a finer resolution search. After the spectral smoothing filter has been calibrated, the analog equalizer is again calibrated by performing an exhaustive search over a range of settings centered around the current optimum setting. The exhaustive search is performed after the spectral smoothing filter has been calibrated to compensate for interdependencies between the two components.

The digital filter 24 can also be calibrated 94 independently by performing a successive approximation search for the tap settings PC1 and PC3 210. If both filters are calibrated 92, multiplexors (26,28) are set 91 to select digital equalization, and the cutoff and boost settings of the analog filter together with the tap settings PC1 and PC3 210 of the digital filter are searched using the successive approximation algorithm.

Figure 14:
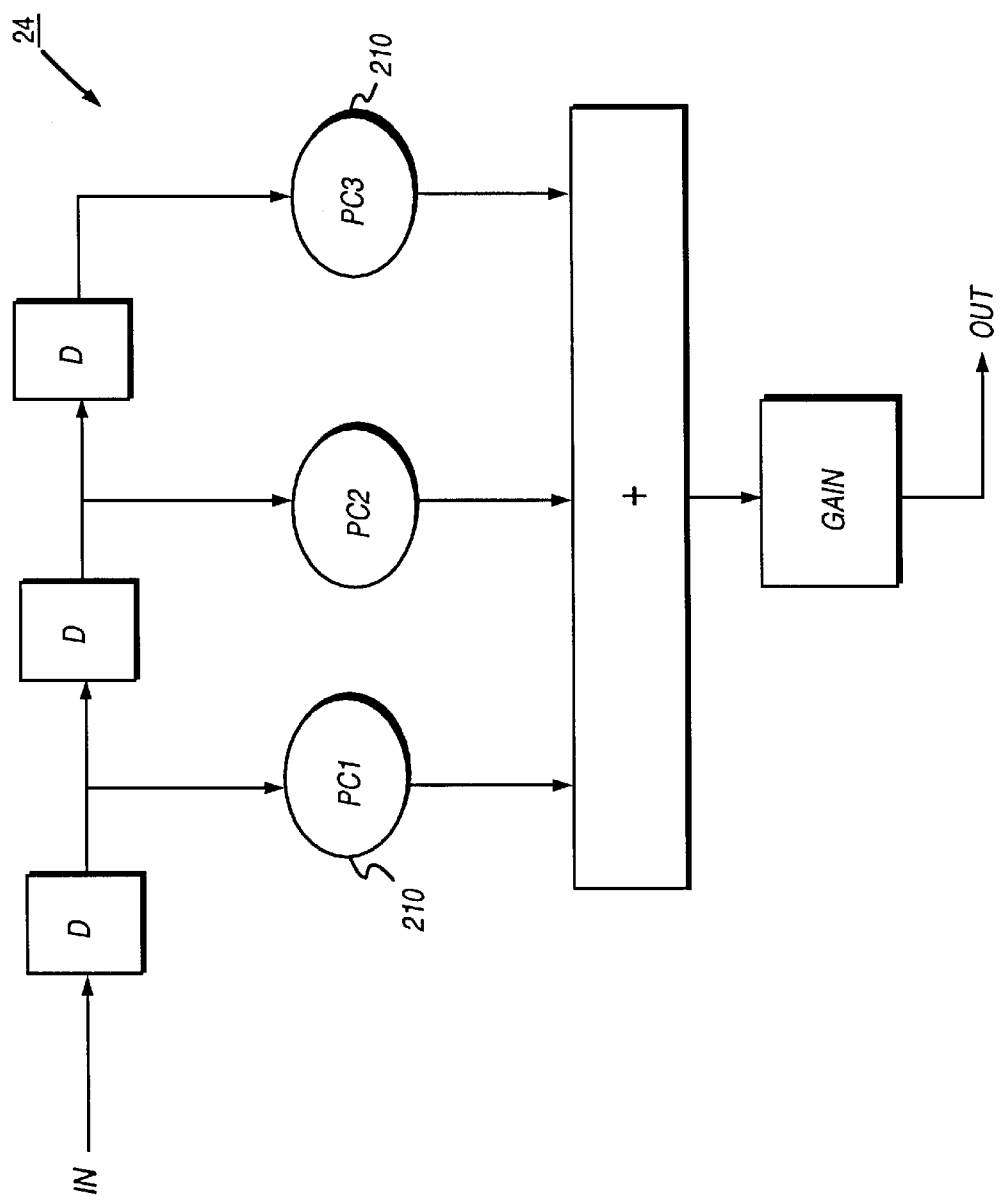
FIG. 14 shows a block diagram of the digital pulse shaping filter.

FIG. 14 shows the digital equalization filter 24 and the PC1 and PC3 taps 210 that are calibrated. Multiplexors (26,28) are used to bypass the digital filter in order to calibrate the analog filter 20 without digital equalization. Continuing to FIG. 6, the timing recovery circuit is locked to the reference 96 if sync was lost, and the filter settings are restored 98 if the sample errors are out of range.

A contour plot of the cutoff and boost settings versus squared gain errors is shown in FIG. 13. Because the successive approximation search is not exhaustive, the optimum settings selected from this plot might be boost=4 and cutoff=34 corresponding to the first minimum error of 0.588. However an exhaustive search performed after the digital equalization and spectral smoothing filters have been calibrated will find the better settings of boost=5 and cutoff=40 corresponding to the actual minimum error of 0.565. As mentioned above, tuning a component coarsely and then with a finer resolution later in the calibration improves the overall performance of the read channel.

After the digital equalization has been calibrated, the center and coarse settings for the automatic gain control circuit are re-calibrated 100 as described above. Re-calibrating a component during the process is necessary because the performance of certain components is interdependent. That is, changing the settings of one component can affect the performance of another component, therefore the later should be re-calibrated.

Figure 6:
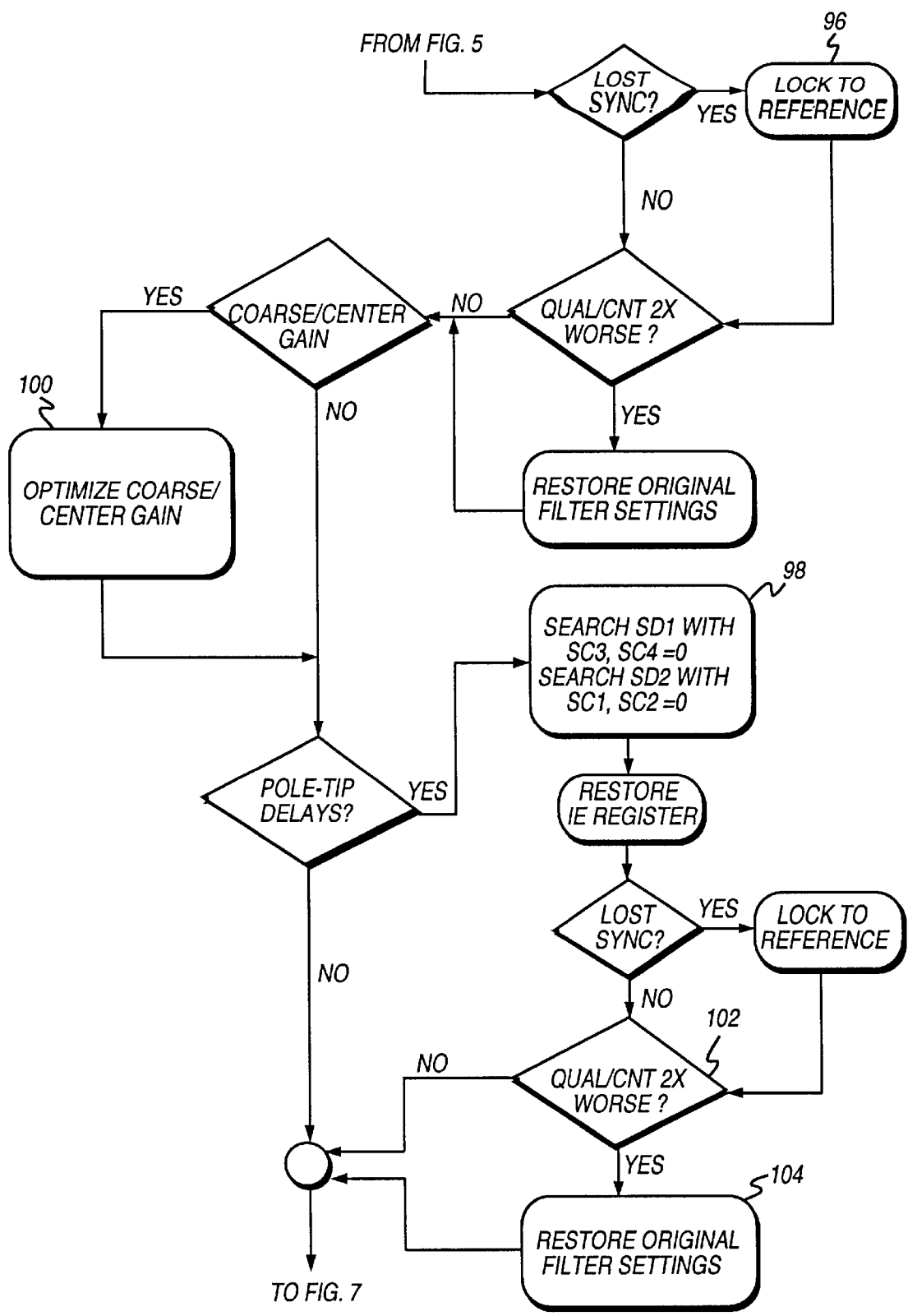
Figure 15:
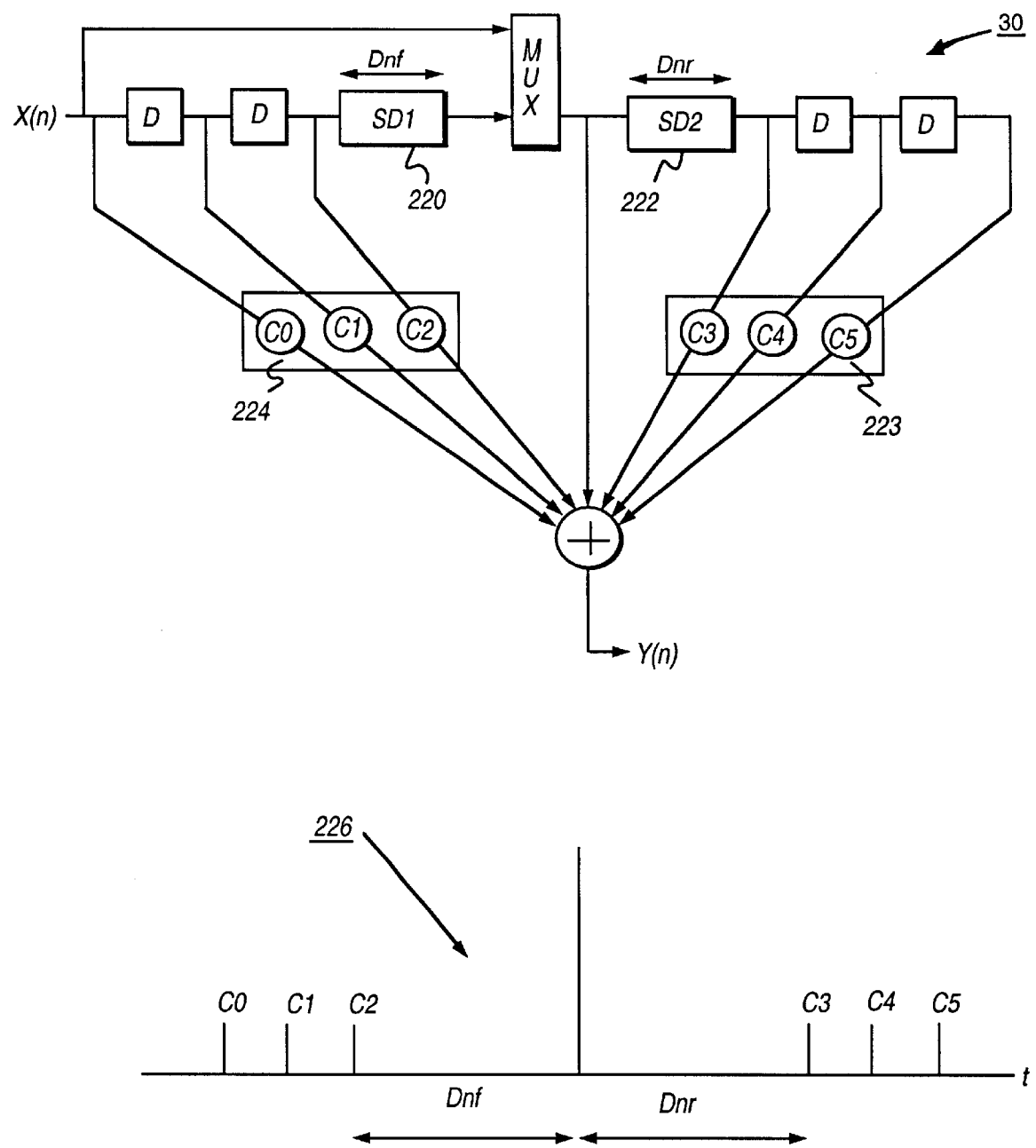
FIG. 15 shows a block diagram of the spectral smoothing filter.

Next, the spectral smoothing 30 filter as shown in FIG. 15 is calibrated. The spectral smoothing filter is used to attenuate undesired secondary pulses created by the magnetic read head. The spectral smoothing filter taps (223,224) and delays (220,222) are calibrated to optimize the impulse response of the filter 226.

first, as shown in FIG. 6, programmable pre-cursor and post-cursor delays SD1 and SD2 (220,222) are searched separately 98 from a minimum to maximum value to quickly find the approximate optimum values that generate a minimum squared sample error. While calibrating one delay, the filter taps associated with the other delay are set to zero. The performance is verified 102 and the original settings restored 104 if the calibration failed.

Figure 7:
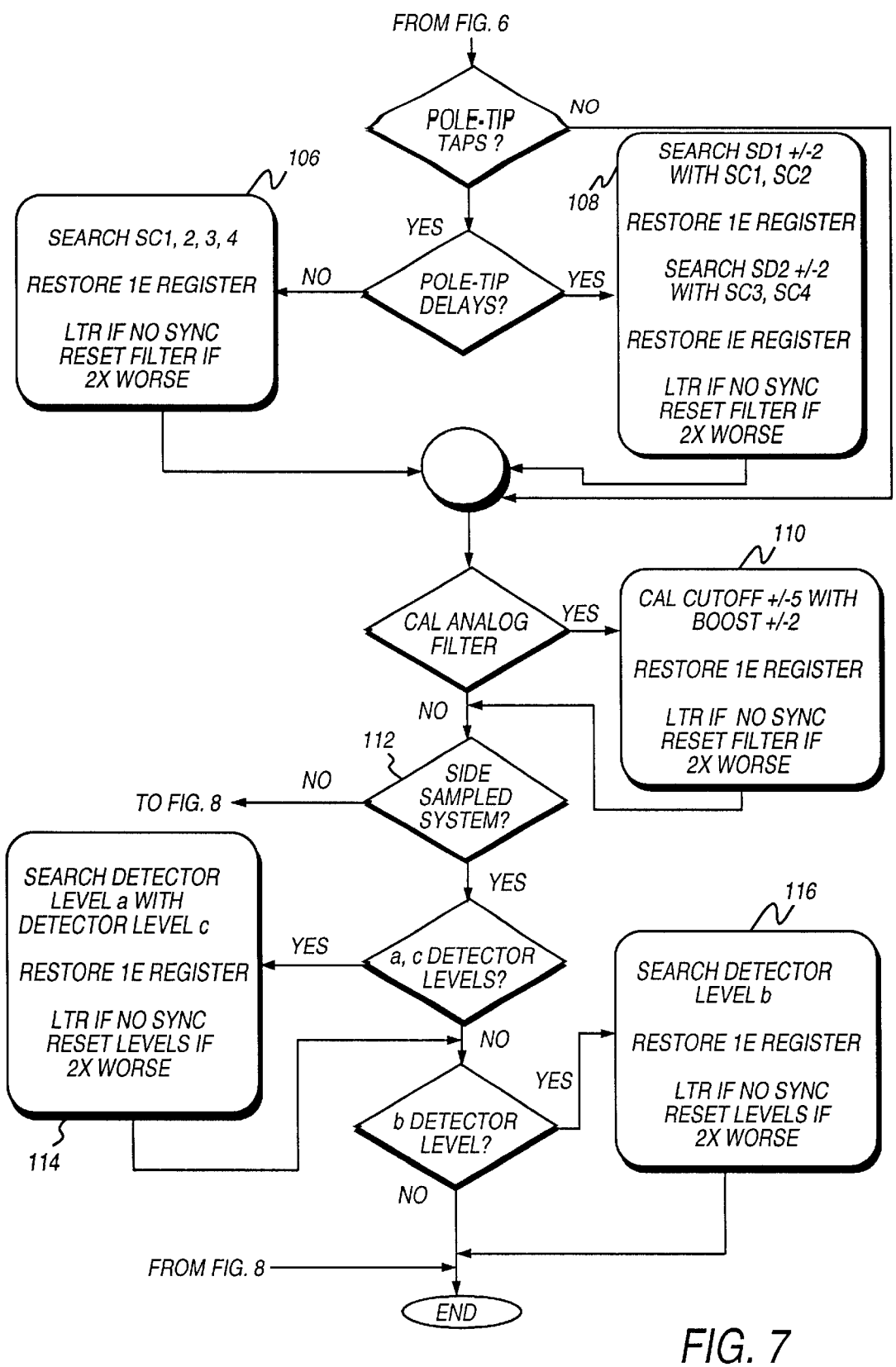

Continuing to FIG. 7, if the spectral smoothing filter delays (220,222) are not being calibrated, the spectral smoothing taps (223,224) are calibrated separately by performing a four dimensional successive approximation search 106. If both the spectral smoothing filter delays (220,222) and the spectral smoothing filter taps (223,224) are being calibrated, then a three dimensional successive approximation search 108 is performed separately for delay 220 and taps 224 and then for delay 222 and taps 223.

Figure 16:
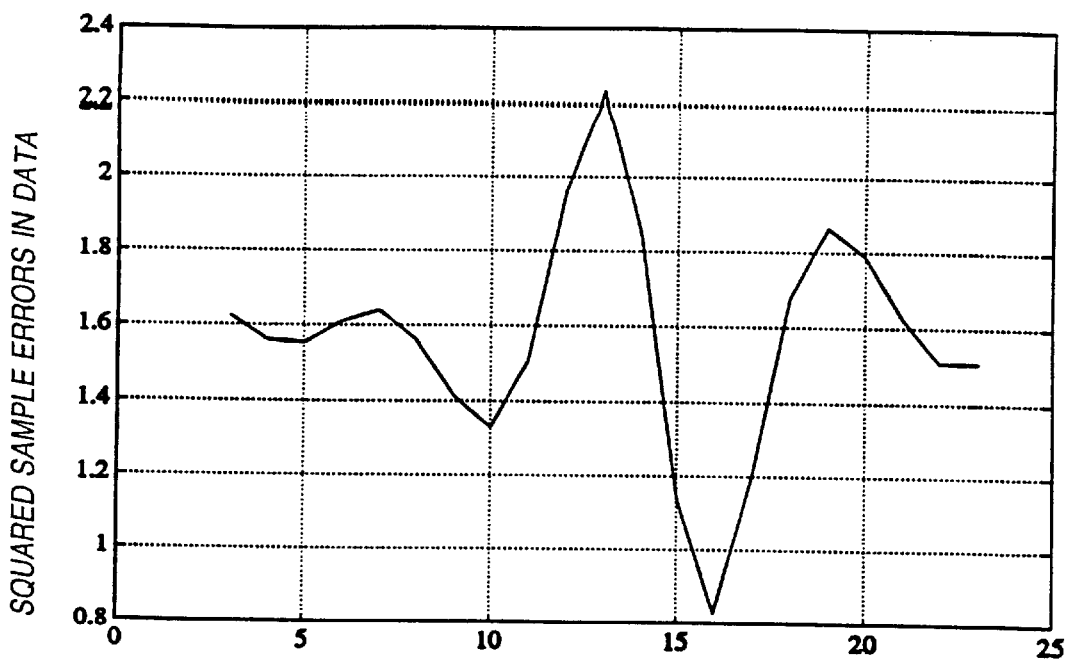
FIG. 16 and FIG. 17 are plots of the spectral smoothing filter delays versus squared sample error.
Figure 17:
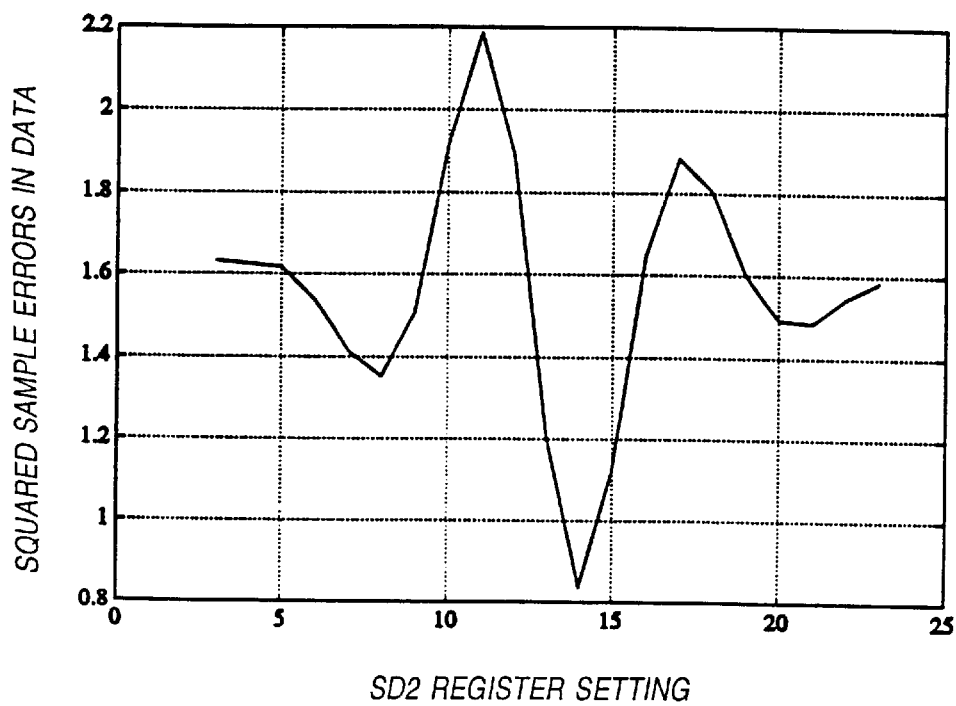

After each calibration the squared sample errors are measured and the original settings re-stored if the calibration failed. The timing recovery is also re-locked to reference if sync was lost. A plot of spectral smoothing filter delays (220,222) versus squared sample errors is shown in FIG. 16 and FIG. 17 and is similar to the pole-tip filter taps (223,224) versus squared sample errors. As shown in the plot, the optimum settings corresponding to the minimum squared errors are SD1=16 and SD2=14.

Once the spectral smoothing filter is calibrated, a finer resolution search 110 over a matrix of cutoff and boost settings is performed for the analog equalization filter 20. This search is delayed from the initial coarse calibration, as described above, to achieve better over all performance. Since this search is exhaustive, the optimum settings corresponding to the actual minimum error of 0.565 as shown in FIG. 13 will be found. The original settings are restored if the calibration fails, and the timing recovery circuit is re-locked to reference if sync is lost.

Figure 18:
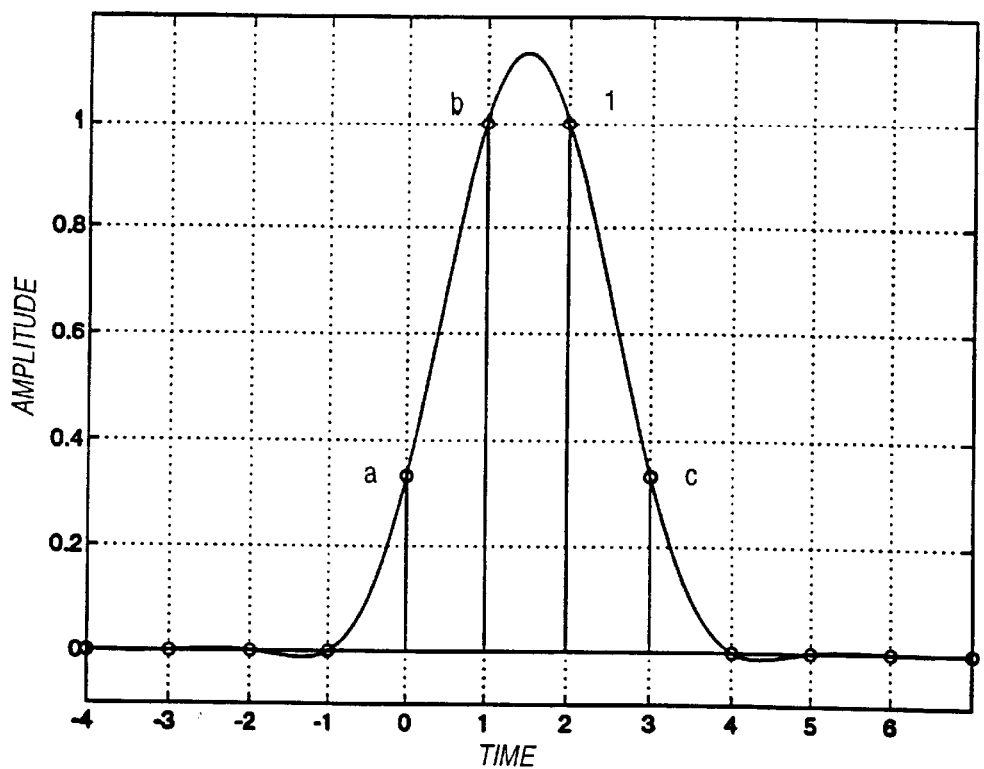
FIG. 18 is an example of the detector level settings for an ideal data pulse using side sampling.

The calibration to this point is attempting to equalize the input pulses to achieve minimum errors; that is, it is attempting to shape the input pulse into a desired target pulse such that the samples match predetermined target settings for the "a", "b", "1", and "c" detector levels depending on the partial response model selected: PR4, EPR4, or EEPR4. An ideal pulse shape with detector levels "a", "b", "1" and "c" for a side sampled EEPR4 model is shown in FIG. 18. However, it may not be possible to completely equalize the pulse to match this desired shape due to noise and asymmetries in the system.

Figure 19:
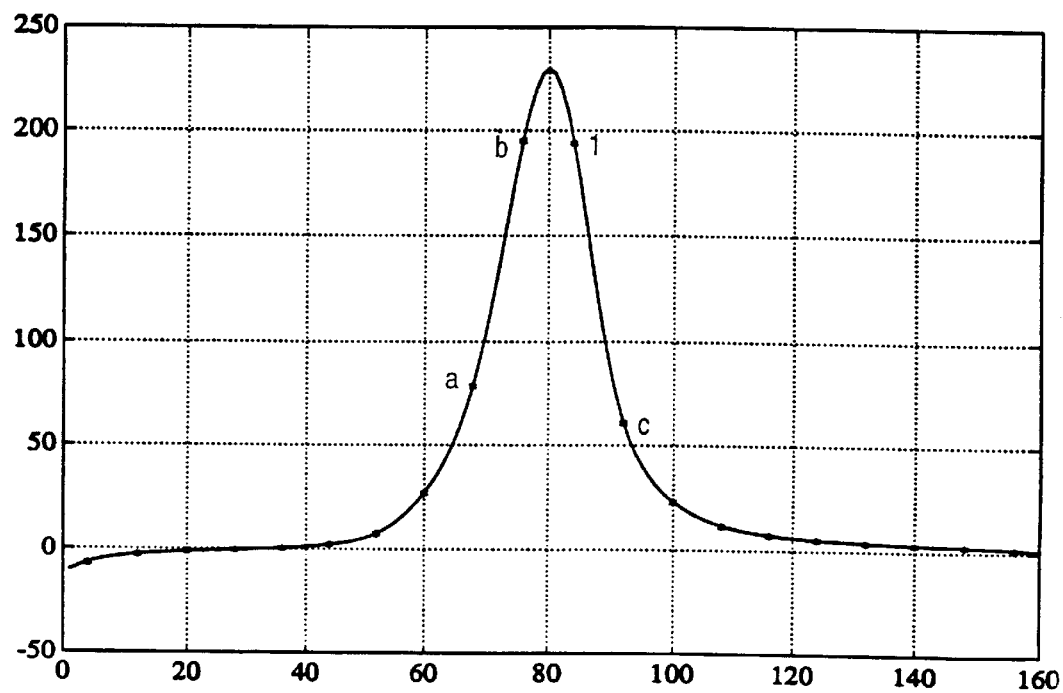
FIG. 19 is an example of the detector level settings for an asymmetrical data pulse using side sampling.

An example of a center sampled EEPR4 pulse not ideally shaped is shown in FIG. 19. Since the pulse is not symmetrical, the samples will not match the ideal "a", "b", "1", and "c" target detector levels as shown in FIG. 18. To compensate for the errors due to asymmetry, the detector target levels can be adjusted as shown in FIG. 18. Instead of using the ideal target levels of (5/16,1,1,5/16) for "a", "b", "1" and "c" respectively, the levels are adjusted to (6/16, 1, 1, 4/16). These optimum target values are determined using the calibration technique of the present invention.

Figure 8:
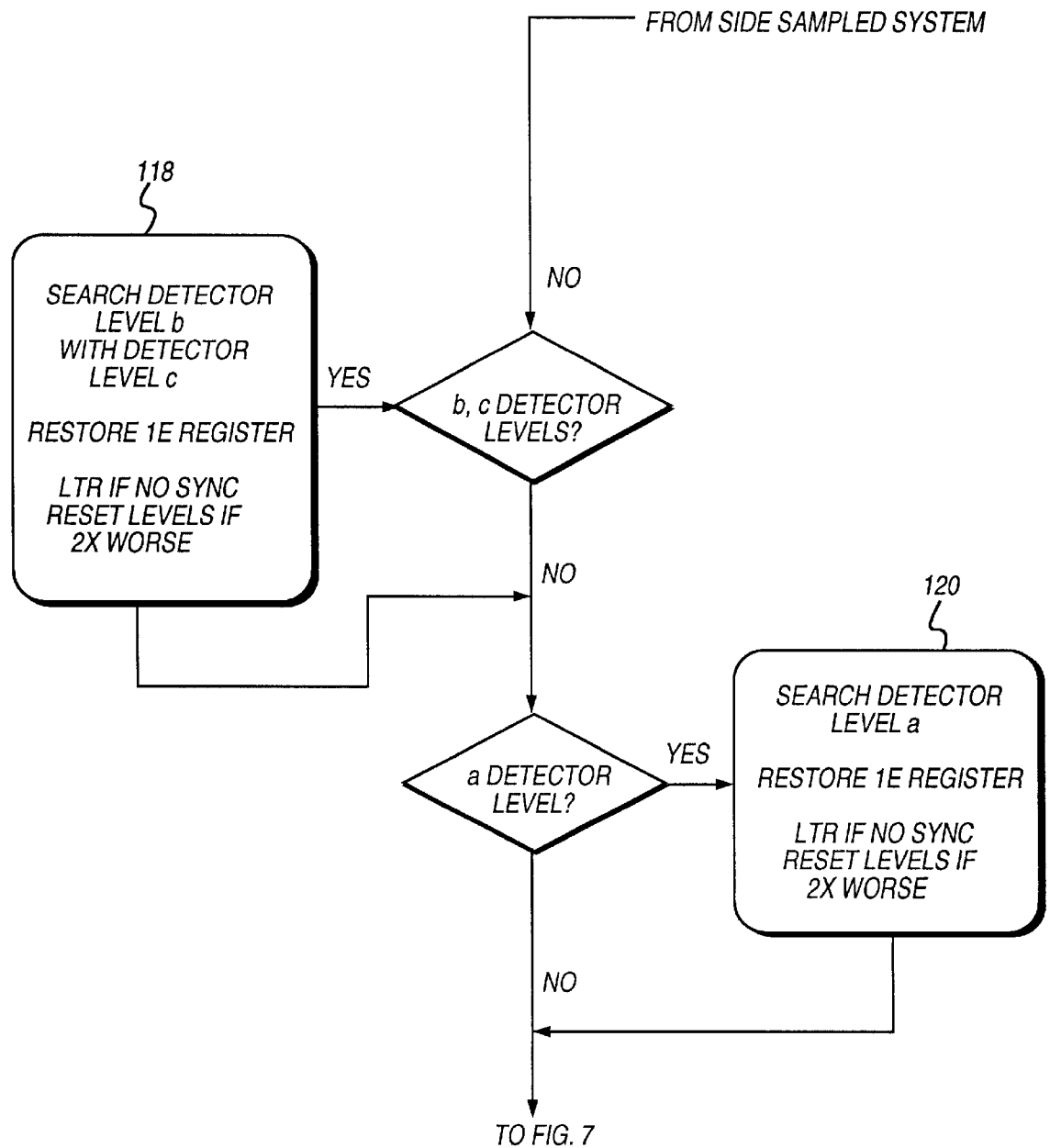
Figure 20:
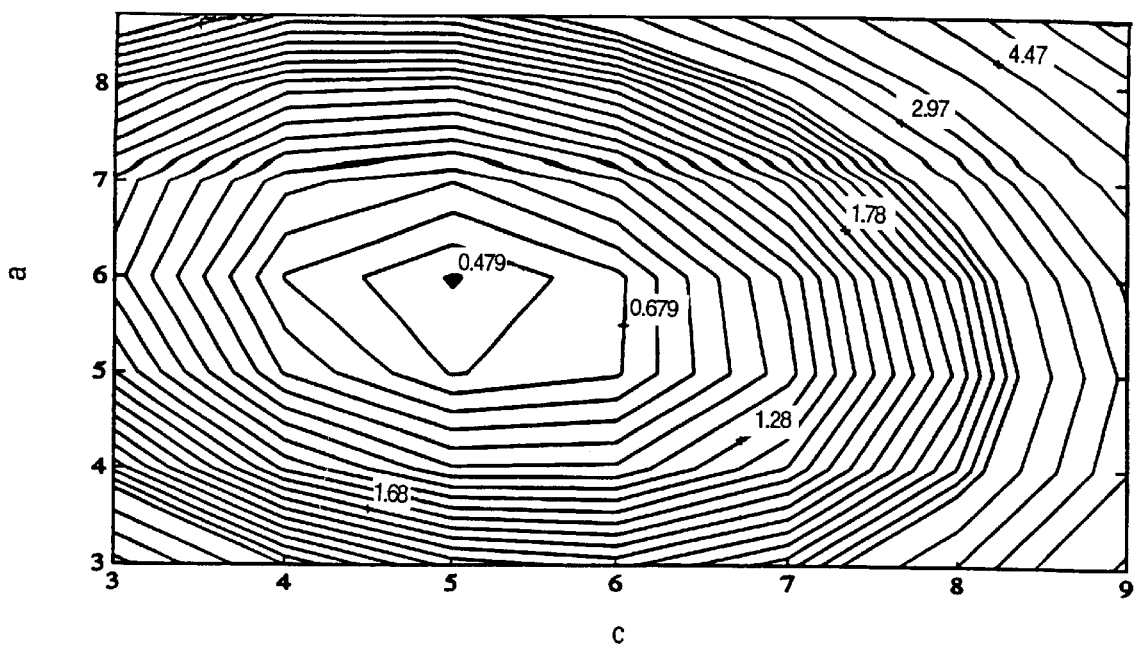
FIG. 20 is a contour plot of the detector levels versus squared sample errors.

Referring now to FIG. 7, the sequence for calibrating the detector levels depends on whether the system is side or center sampled 112. If center sampling is used, then as shown in FIG. 8 the "b" and "c" target levels are determined 118 using a two dimensional successive approximation search, and then target level "a" is searched 120 over a range of values. If side sampling is used, then the "a" and "c" target levels are determined 118 using a two dimensional successive approximation search, and then target level "b" is searched 120 over a range of values. The original settings are restored if the calibration fails. FIG. 20 shows the resulting contour plot of squared sample errors versus ("a", "c") target detector levels from an example calibration. The minimum error of 0.479 corresponds to target levels of "a" =6/16 and "c" =5/16.

Another error measurement provided by the channel quality circuit is the bit error rate which is the difference between the known test sequence written to the storage medium and the sequence decoded by the read channel. The bit error rate is used to verify the overall effectiveness of the calibration, and the read channel is re-calibrated until a desired minimum bit error rate is achieved.

In magnetic disk storage systems, the pulses are stored in tracks which are circular rows of bits arranged concentrically on the disk. In most disk storage systems, it is desirable to keep the amount of data per track constant. The amount of data that can be stored on a single track is limited by inter-symbol interference. Thus the maximum amount of data per track is limited by the amount of data that can be stored on the inner tracks where the diameter is smallest and inter symbol-interference is largest. Consequently, less than the maximum amount of data is stored on the outer tracks where the inter-symbol interference is smaller because the physical diameter is larger.

To increase the data capacity of the disk, the disk is partitioned into several zones where each zone contains several tracks. The amount of data per track between each zone varies, but the amount of data per track within a zone is constant. The outer zones store more data than the inner zones, therefore more data can be stored on a disk than if zones are not used.

Figure 21:
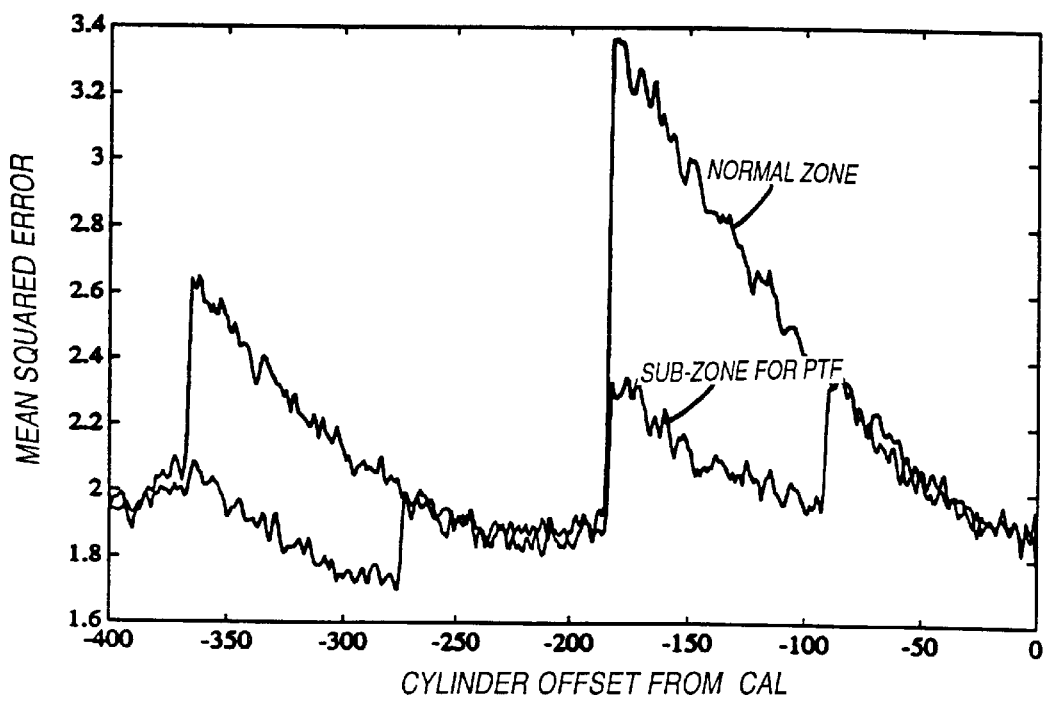
FIG. 21 is a plot of squared sample errors for each zone of the storage medium and the improvement gained when calibrating the read channel over subzones.

As the density changes, the pulse characteristic changes between zones due to varying inter symbol interference. Therefore the read channel should be calibrated for each zone. Even better performance is achieved by calibrating the read channel over a number of subzones within each zone so that changes in inter-symbol interference within a zone can be compensated for. The number of subzones calibrated varies depending on the width of the zones. FIG. 21 is a plot of the squared sample errors across two zones and the improvement gained by calibrating over two subzones within each zone.

When the calibration is completed, the optimum settings are stored in memory and later used to calibrate the read channel components during normal operation. For magnetic disk drive storage systems the calibration is performed for each magnetic disk and associated read head, as well as for each zone and subzone as described above.

What has been disclosed and described in a preferred embodiment is a method and apparatus for calibrating a read channel IC. The calibration is accomplished by incorporating a channel quality circuit within the read channel IC for measuring the performance of each component. Each component is programmed in sequence or in combination with a plurality of different parameters and the performance of the read channel recorded. The settings that produce the best performance, as determined by a minimum error measurement, are used to program the channel. By calibrating the components successively in a particular sequence or in combination, the read channel is tuned to the particular characteristics of the storage system. The effectiveness of the calibration can be determined by measuring a bit error rate that is also automatically generated by the channel quality circuit, and the calibration is repeated until a desired bit error rate is achieved. This calibration process is performed during manufacturing and after the storage system is repaired. The storage system is also re-calibrated periodically during its lifetime to compensate for changes that occur over time.

Having thus described a preferred embodiment of the present invention, it will be appreciated that the objects of the invention have been fully achieved, and it is understood by those skilled in the art that many changes in the calibration process will be suggested without departing from the spirit of the invention. The disclosure herein is intended to be illustrative and is not in any sense limiting of the invention. The scope of the invention is to be construed with respect to the following claims.

We claim:

1. A method for calibrating a programmable discrete time equalizing filter of a synchronous read channel IC utilized in a magnetic data storage system to achieve an optimum operating mode, comprising the steps of:

(a) programming the discrete time equalizing filter of the synchronous read channel IC with at least one component setting;

(b) reading data from a magnetic storage medium using the synchronous read channel IC;

(c) generating at least one measured error value within the synchronous read channel IC;

(d) repeating steps (a) through (c) at least once; and (e) programming the discrete time equalizing filter with at least one component setting responsive to the measured error values of step (c).

2. The method for calibrating a programmable discrete time equalizing filter as recited in claim 1, wherein the at least one component setting comprises a plurality of programmable filter coefficient settings.

3. The method for calibrating a programmable discrete time equalizing filter as recited in claim 1, wherein the measured error value of step (c) is a sample error value generated proportional to a difference between an actual sample value and an expected sample value.

4. A method for calibrating a programmable continuous time analog equalizing filter of a synchronous read channel IC utilized in a magnetic data storage system to achieve an optimum operating mode, comprising the steps of:

(a) programming the continuous time analog equalizing filter of the synchronous read channel IC with at least one component setting;

(b) reading data from a magnetic storage medium using the synchronous read channel IC;

(c) generating at least one measured error value within the synchronous read channel IC;

(d) repeating steps (a) through (c) at least once; and (e) programming the continuous time analog equalizing filter with at least one component setting responsive to the measured error values of step (c);

wherein the measured error value of step (c) is a sample error value generated proportional to a difference between an actual sample value and an expected sample value.

5. The method for calibrating a programmable continuous time analog equalizing filter as recited in claim 4, wherein the at least one component setting comprises a programmable cutoff setting.

6. The method for calibrating a programmable continuous time analog equalizing filter as recited in claim 4, wherein the at least one component setting comprises a programmable boost setting.

7. A method for calibrating a programmable timing recovery circuit of a synchronous read channel IC utilized in a magnetic data storage system to achieve an optimum operating mode, comprising the steps of:

(a) programming the timing recovery circuit of the synchronous read channel IC with at least one component setting;

(b) reading data from a magnetic storage medium using the synchronous read channel IC;

(c) generating a timing recovery phase error value within the synchronous read channel IC proportional to a difference between an actual phase error value and a desired phase error value;

(d) repeating steps (a) through (c) at least once; and (e) programming the timing recovery circuit with at least one component setting responsive to the phase error values of step (c).

8. The method for calibrating a programmable timing recovery circuit as recited in claim 7, wherein the timing recovery circuit comprises a voltage controlled oscillator (VCO) and the at least one component setting comprises a programmable center frequency setting of the VCO.

9. A method for calibrating a programmable gain control circuit of a synchronous read channel IC utilized in a magnetic data storage system to achieve an optimum operating mode, comprising the steps of:

(a) programming the gain control circuit of the synchronous read channel IC with at least one component setting;

(b) reading data from a magnetic storage medium using the synchronous read channel IC;

(c) generating a gain error value within the synchronous read channel IC proportional to a difference between an amplitude of an actual sample value and an amplitude of an expected sample value;

(d) repeating steps (a) through (c) at least once; and (e) programming the gain control circuit with at least one component setting responsive to the gain error values of step (c).

10. The method for calibrating a programmable gain control circuit as recited in claim 9, wherein the programmable gain control circuit comprises a variable gain amplifier (VGA) and the at least one component setting comprises a programmable center setting of the VGA.

11. A method for calibrating a programmable synchronous read channel IC for reading recorded data from a magnetic disk, the magnetic disk partitioned into a plurality of zones wherein a data rate of the recorded data is constant for each zone and increases from an inner diameter zone to an outer diameter zone, the method of calibrating comprising the steps of:

(a) partitioning at least one of the zones into a plurality of subzones wherein the data rate of the recorded data is constant across the subzones;

(b) programming at least one component of the synchronous read channel IC with at least one component setting;

(c) reading data from a first subzone of the magnetic disk using the synchronous read channel IC;

(d) generating a measured error value within the synchronous read channel IC;

(e) repeating steps (b) through (d) at least once;

(f) programming the at least one component with at least one component setting responsive to the measured values of step (d); and (g) repeating steps (b) through (f) wherein step (c) is modified by reading data from a second subzone.

12. A method for calibrating an automatic gain control circuit of a read channel IC utilized in a magnetic data storage system to achieve an optimum operating mode, comprising the steps of:

(a) programming a coarse setting of the automatic gain control circuit to a mid-range value;

(b) programming a center operating setting of the automatic gain control circuit with a value selected from a plurality of center operating values;

(c) reading data from a magnetic storage medium using the read channel IC;

(d) generating at least one measured error value within the read channel IC;

(e) repeating steps (b) through (d) at least once;

(f) programming the center operating setting with a center operating value responsive to the measured error values of step (d);

(g) programming the coarse setting of the automatic gain control circuit with a value selected from a plurality of coarse values;

(h) reading data from a magnetic storage medium using the read channel IC;

(i) generating at least one measured error value within the read channel IC;

(j) repeating steps (g) through (i) at least once; and (k) programming the coarse setting with a coarse value responsive to the measured error values of step (h).

13. A method for calibrating a timing recovery circuit of a read channel IC utilized in a magnetic data storage system to achieve an optimum operating mode, comprising the steps of:

(a) programming a zero phase start setting of the timing recovery circuit with a value selected from a plurality of zero phase start values;

(b) reading data from a magnetic storage medium using the read channel IC;

(c) generating at least one measured error value within the read channel IC;

(d) repeating steps (a) through (c) at least once; and (e) programming the zero phase start setting with a zero phase start value responsive to the measured error values of step (c).

14. A method for calibrating a spectral smoothing filter of a read channel IC utilized in a magnetic data storage system to achieve an optimum operating mode, comprising the steps of:

(a) programming a pre-cursor delay setting and a post-cursor delay setting of the spectral smoothing filter with values selected from a plurality of pre-cursor and post-cursor delay values;

(b) reading data from a magnetic storage medium using the read channel IC;

(c) generating at least one measured error value within the read channel IC;

(d) repeating steps (a) through (c) at least once; and (e) programming the pre-cursor delay setting with a pre-cursor delay value and the post-cursor delay setting with a post-cursor delay value responsive to the measured error values of step (c).

15. A method for calibrating a sequence detector of a read channel IC utilized in a magnetic data storage system to achieve an optimum operating mode, comprising the steps of:

(a) programming a target level setting of the sequence detector with a value selected from a plurality of target level values;

(b) reading data from a magnetic storage medium using the read channel IC;

(c) generating at least one measured error value within the read channel IC;

(d) repeating steps (a) through (c) at least once; and (e) programming the target level setting with a target level value responsive to the measured error values of step (c).

16. A successive approximation method for calibrating at least one programmable component of a read channel IC in a magnetic data storage system to achieve an optimum operating mode, comprising the steps of:

(a) programming a first programmable component of the read channel IC with at least one component setting selected from a first plurality of component settings; and (b) programming a second programmable component of the read channel IC with at least one component setting selected from a second plurality of component settings; and (c) reading data with the read channel IC; and (d) generating at least one measured error value within the read channel IC; and (e) repeating steps (a) through (d) until the first and second programmable components have been programmed with all possible combinations of component settings selected from the first and second plurality of component settings; and (f) modifying the first plurality of component settings by centering the settings around a first setting corresponding to the first component and responsive to the measured error values of step (d), and modifying the second plurality of component settings by centering the settings around a second setting corresponding to the second component and responsive to the measured error values of step (d); and (g) iterating steps (a) through (f) until the first and second settings of step (f) are substantially the same as the first and second settings of step (f) of a prior iteration; and (h) programming at least one of the first and second components with the corresponding first and second settings of step (g).

* * * * *